Aug. 2, 1960   J. VERHOEFF ET AL   2,947,195
AXIALLY DISPLACEABLE STOP
Filed Sept. 11, 1956
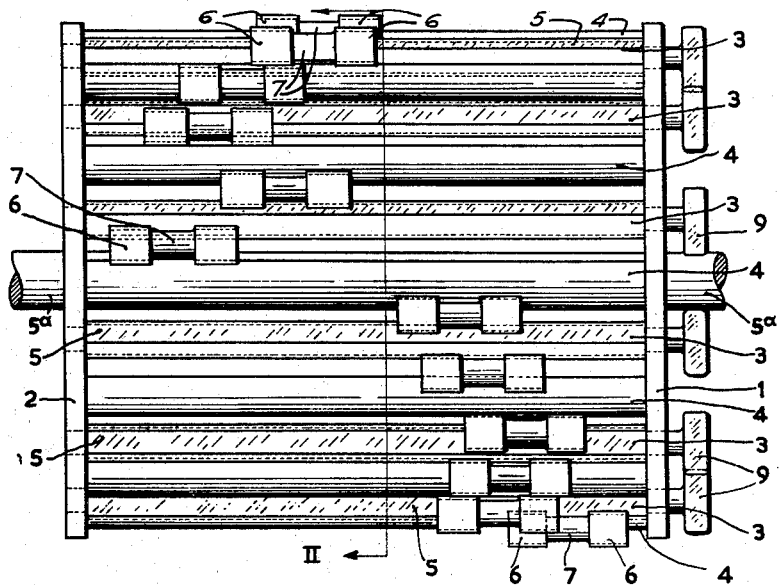
FIG.1
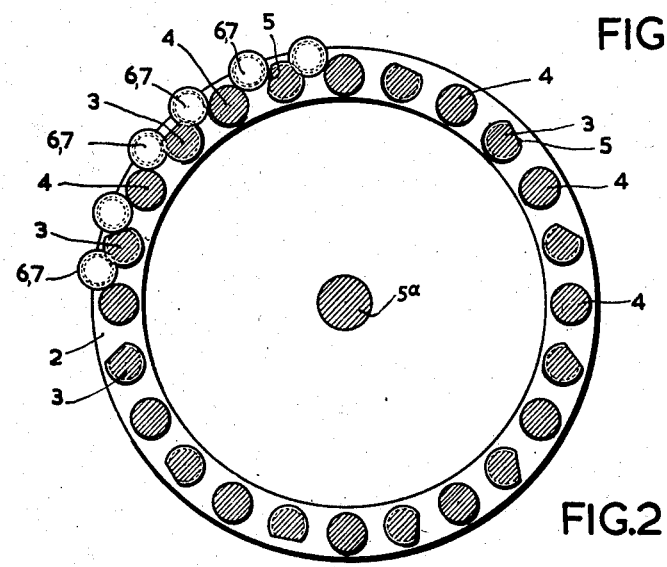
FIG.2
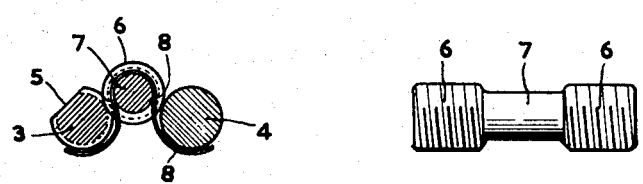
FIG.3   FIG.4
INVENTOR
JACOB VERHOEFF
HENNY VAN BOEYEN
BY 
AGENT United States Patent Office 2,947,195
Patented Aug. 2, 1960

2,947,195

AXIALLY DISPLACEABLE STOP

Jacob Verhoeff and Henny van Boeyen, Hilversum, Netherlands, assignors, by mesne assignments, to North American Philips Company, Inc., New York, N.Y., a corporation of Delaware Filed Sept. 11, 1956, Ser. No. 609,235

Claims priority, application Netherlands Oct. 24, 1955

5 Claims. (Cl. 74—526)

Adjustable stops are employed in practice for numerous purposes. These stops are sometimes clamped tight on a rail by means of a screw in other cases the stop is provided with screw thread and is displaceable in a stationary body. With shaft adjusting mechanisms it is known to use a cylinder provided with outer or inner grooves with screw thread, along which a stop can be screwed. In this case one must try to engage the stop, for example by means of a long screw driver, and turn it, which gives often rise to difficulties, since the position of the stop is not visible. The invention renders the adjustment of such a stop much simpler and avoids the use of grooves, which are costly in manufacture, and is characterized in that the stop is locked between at least two stationary supports and has one or more extensions or grooves adapted to co-operate with one or more grooves or extensions on at least one of the supports, at least one of the supports provided with grooves or extensions and the stop being rotatable relative to one another in a manner such that in a given position of the support the extensions are engaged in the grooves and in a further position the extensions are free from the grooves.

In one embodiment of the invention the stop has a circular section and is provided with a screw thread, preferably of a small pitch, at least one of the supports having an identical screw thread and flattened parts, the height of which exceeds the depth of the screw thread on the stop. In this embodiment of the invention the extensions and grooves are replaced by a screw thread, the manufacture of which is cheaper.

In accordance with a further aspect of the invention provision is preferably made of two supports having a circular sectional area, the distance between them being smaller than the diameter of the screw thread on the stop, one support having a flattened part, the distance of the center of which from the other support being smaller than the largest diameter of the stop. This also makes the construction much more inexpensive to manufacture.

In a further embodiment of the invention the stop consists of two identical, screwthreaded parts, secured to one another by a rod-shaped central part, the diameter of which is smaller than the core diameter of the screw thread, this central part being surrounded by a spring, which lies below each support on each side.

A plurality of adjustable stops may be united to form one body. According to one aspect of the invention this is preferably obtained by providing a cage-shaped body of circular section consisting of two head plates interconnected by stiles which constitute the supports, between each pair of circular supports provided with screw thread and a flattened part being arranged a smooth, circular support, the supports provided with screw thread and a flattened part projecting on one side beyond the head plates, where they are provided with means to turn them. These means may, for example, be constituted by a square, a slot or the like. The rotation of the supports does not require special tools, if in accordance with a further aspect of the invention the cage-shaped body is arranged so as to be rotatable and if provision is made of a stationary, preferably electrically movable arm, which by pushing a wing on the ends of the supports projecting beyond the head plates, can rotate the support located under the arm, if necessary against the force of a spring.

The invention will be described more fully with reference to a drawing, which shows one embodiment of the invention and in which Fig. 1 shows a view of a cage with adjustable stops, Fig. 2 a section of the cage shown in Fig. 1, viewed in the direction of the arrow, Fig. 3 illustrates a section at right angles to the centre lines of two supports with one stop on an enlarged scale and Fig. 4 shows a separate stop also on an enlarged scale.

Referring to Figs. 1 and 2 reference numerals 1 and 2 designate two head plates, between which a plurality of supports 3 and 4 are arranged so that a cage-shaped body is formed, which is rotatable about a shaft 5; the supports 4 are smooth throughout their lengths and have a circular section; the supports 3, however, are provided with screw thread throughout their lengths and have a flattened part 5. One support 3 is located between two supports 4. The distance between the supports is such that a stop 6 can bear on them and even when a support 3 is rotated in a manner such that the stop 6 bears on one side on the flattened part 5, this stop does not fall down between the supports 3 and 4, but bears thereon as before. The stop 6 consists of two screw-threaded parts and a circular central part 7 without screw thread, having a smaller diameter than the diameter of the screw thread. A spring 8 surrounds this central part 6 and lies under the supports 3 and 4. The supports 3 with their flattened parts project at the end through the head plate 1 and are locally provided with a wing 9; they are rotatable in the head plates 1 and 2.

It is obvious that the stops 6 engage with their screw threads the screw threads of the supports 3 under the action of the spring 8, so that they occupy a fixed position. When an arm (not shown), which may be moved for example by an electrical relay (not shown) exerts a force on the wing 9, so that the support associated with this wing rotates, the flattened part 5 engages the stop 6, which can slide freely along the supports 3 and 4. As soon as the arm releases the wing 9, the support 3 returns, for example under the action of a spring (not shown) into the position shown in Fig. 3 and the stop 6 is fixed in the new position. As a matter of course, the supports may be provided with a square or a slot, so that by means of a suitable key or a screw driver the supports 3 can be turned.

The supports may lie in a flat plane, so that a plurality of stops may also lie in a flat plane. The entire structure of supports and stops may then be moved for example in a direction at right angles to the direction of length of the stops, so that each time a different stop contacts the same stud. Conversely, the stud may be moved and the structure of stops and supports may occupy a fixed position. The supports need not have a circular section; the section may, for example, be square. The screw thread as a coupling element between the stop and the supports is not required, but it provides the simplest solution; in certain conditions an extension with grooves may be preferred.

What is claimed is:

1. An axially adjustable stop arrangement comprising at least two substantially parallel, spaced supports, and a slidable stop therebetween, a resilient member surrounding a portion of said stop and engaging said spaced supports on either side of said stop, one of said supports being provided with a longitudinal flattened portion and being rotatable whereby in a selected position of said one support said slidable stop is free for axial movement and in other positions thereof said stop is fixed and prevented from movement.

2. An axially adjustable stop arrangement comprising at least two substantially parallel spaced supports, one of said supports being rotatable and being substantially circular in cross-section and having a longitudinal flattened portion, said one support being at least partially screw-threaded, a slidable stop between said supports, a resilient member surrounding a portion of said stop and engaging said spaced supports on either side of said stop, said slidable stop having screw threads complementary to the screw threads of said one support, said one support being rotatable to a position whereby said flattened portion is adjacent to said slidable stop whereby said slidable stop is free for linear, sliding movement, and to the other positions where said one support is screw-connected to said stop to thereby prevent any relative movement of the stop and the one support.

3. An axially adjustable stop arrangement comprising at least two substantially parallel, spaced support rods, one of said support rods being rotatable and being substantially circular in cross-section and having a longitudinal flattened portion, said one support being at least partially screw-threaded, a slidable stop between said supports, a spring surrounding a portion of said stop and engaging said spaced support rods on either side of said stop, said slidable stop having screw threads complementary to the screw threads of said one support, said one support being rotatable to a position whereby said flattened portion is adjacent to said slidable stop whereby said slidable stop is free for linear, sliding movement, and to the other positions where said one support rod is screw-connected to said stop to thereby prevent any relative movement of the stop and the one support, the distance between the adjacent peripheries of said support rods being smaller than the diameter of the screw thread on said slidable stop, and the distance between said flattened part and the adjacent periphery of said parallel support rod being greater than the largest diameter of said slidable stop.

4. An axially adjustable stop arrangement as claimed in claim 3 wherein said slidable stop is cylindrical in shape and has screw-threaded enlarged end portions, and an intermediate portion having a diameter which is smaller than the diameter of the screw threaded end portion, a spring engaging a part of said intermediate portion and having its ends engaging the underside of said spaced support rods.

5. An axially adjustable stop arrangement comprising a cage-shaped structure having a circular cross-section, said structure being provided with two relatively flat end plates, and a plurality of substantially parallel support rods interconnecting said end plates, alternate support rods being screw-threaded, rotatable, and having longitudinal flattened portions, handle means on one end of said alternate support rods for turning the latter, and a slidable stop between adjacent parallel support rods having screw threads complementary to the screw threads of said alternate support rods, a spring surrounding a portion of said stop and engaging said spaced support rods on either side of said stop, said alternate support rods being rotatable to a position whereby said flattened portion is adjacent to said slidable stop whereby said slidable stop is free for linear sliding movement, and to the other positions where said stop is screw-threaded to said alternate support rods and is prevented from any relative movement.

References Cited in the file of this patent

UNITED STATES PATENTS

| 195,650 | Robb | Sept. 25, 1877 |
| 2,187,986 | Read | Jan. 23, 1940 |
| 2,259,291 | Chapman | Oct. 14, 1941 |
| 2,536,624 | Bullard | Jan. 2, 1951 |

FOREIGN PATENTS

| 662,883 | Great Britain | Dec. 12, 1951 |